US005690826A

United States Patent [19]
Cravello

[11] Patent Number: 5,690,826
[45] Date of Patent: Nov. 25, 1997

[54] SHAKER SCREEN ASSEMBLY

[76] Inventor: William Myron Cravello, 12535 E. 20th Pl., Tulsa, Okla. 74128

[21] Appl. No.: 718,961

[22] Filed: Sep. 26, 1996

Related U.S. Application Data

[62] Division of Ser. No. 644,313, Sep. 10, 1996.
[51] Int. Cl.⁶ .................................................. B01D 29/07
[52] U.S. Cl. .......................... 210/384; 210/499; 209/313; 209/399; 209/405; 209/408; 209/413
[58] Field of Search ............................ 210/384, 499; 209/399, 403, 405, 395, 408, 404, 402, 413, 313

[56] References Cited

U.S. PATENT DOCUMENTS

| | | | |
|---|---|---|---|
| 3,684,091 | 8/1972 | Wehner | 210/499 |
| 4,019,987 | 4/1977 | Krasnow | 210/499 |
| 4,082,657 | 4/1978 | Gage | 209/311 |
| 4,167,478 | 9/1979 | Salete | 209/331 |
| 4,820,407 | 4/1989 | Lilie | 210/499 |
| 5,392,925 | 2/1995 | Seyffert | 209/405 |
| 5,417,858 | 5/1995 | Derrick et al. | 210/499 |
| 5,417,859 | 5/1995 | Bakula | 210/499 |
| 5,551,575 | 9/1996 | Leone | 209/403 |

Primary Examiner—W. L. Walker
Attorney, Agent, or Firm—Molly D. McKay

[57] ABSTRACT

A new type of filter assembly which can be employed to retrofit an existing shaker or which can be built as an integral part of a new shaker. The assembly is comprised of a series of compartments arranged in cascading fashion within the shaker. Each compartment is provided with a removable hookless corrugated filter having no additional support backing which secures between a perforated bottom of the compartment and a removable and reclosable lid. Each filter is sealed and supported from below, at its front and rear edges and along its sides within its respective compartment upon removable corrugated lips provided in each of the compartments. Each lid is provided with a plurality of downwardly extending parallel blades which coincide with and engage valleys of the corrugated filters to seal and support the filters within their respective compartments when the lids are closed. Removable common walls are provided on the assembly between adjacent compartments and the assembly is provided with a removable rear wall. Each of the common and rear walls is provided with port holes which coincide with valleys of the corrugations of the filters in order to allow tailings to pass between adjacent compartments and to exit the assembly.

9 Claims, 6 Drawing Sheets

SHAKER SCREEN ASSEMBLY

This application is a divisional of Ser. No. 08/644,313, which was filed May 10, 1996 and is still pending.

BACKGROUND OF THE INVENTION

1. Field of the Invention

The present invention relates to a new type of shaker screen assembly for use in a shale shaker such as shakers designed to remove solids from drilling fluids. More specifically, the present invention is a new type of filter and a reclosable assembly for removably securing the filter within a shaker.

2. Description of the Related Art

In the drilling industry, shakers are used to remove large amounts of coarse, drilling cuttings from drilling fluids so that the drilling fluids are able to be reused or recirculated within the well being drilled. The cuttings are generally filtered out of the drilling fluid on a series of rearwardly canted filters provided within the shaker. Dirty drilling fluid is introduced onto a top side of a front screen of a series of screens provided in the shaker. The drilling fluid flows through the filters and the cuttings, or tailings as they are sometimes called, remain on the top side of the filters. The drilling fluid which flowed through the filters is now clean of coarse debris and is ready to be cleaned via other processes prior to being ready for reuse. Due to the shaking action of the shaker, the tailings which were separated out of the drilling fluid are propelled rearwardly along the front canted filter until they reach the back edge of the first filter in the series and fall down to the adjacent front edge of the next filter in the series. The tailings move rearward along the next canted filter in the series as described for the front filter until finally, when the tailings reach the back edge of the last filter in the series, the tailings are relatively dry and they fall off the last filter into a tailings disposal portion of the shaker and are thus eliminated from the shaker.

Prior art filters have been secured within the shaker by means of clamps which secure to a wall of the shaker via bolts. There are two common types of filters in use, the hookstrip type and the rigid frame or pretensioned type. For hookstrip filters, when the bolts are tightened, the clamps which secure the screens to the shaker engage a lip provided on the filters, thereby pulling the filters tightly between the opposite walls of the shaker and over arched support components provided on the shaker. The arched support components extend between the opposite walls of the shaker and are secured to the walls by slotted tabs provided on the walls of the shaker. Those slotted tabs have slots provided therein into which the arched support components insert. The arched supports extend transverse to the longitudinal axis of the filters. These arched support components usually rest upon longitudinal supports provided in the shaker. These longitudinal supports are usually approximately parallel to the longitudinal axis of the filters.

For hookstrip filters, the bolts securing the filters to the shaker are typically called tensioning bolts and the clamps are typically called drawbars. For filters which employ a supporting sheet of perforated metal as an integral part of the filter, also known as rigid frame or pretensioned panels, the clamps simply secure the filters to the shaker, since no further tensioning of the filters is needed.

One of the problems encountered with these prior art filters is that for those that employ metal supports, i.e., metal frames, sheets, bands or slats, as an integral part of the filters, the cost of each of these filters includes the additional cost of these supports and the necessary attachment of the wire cloth to the supports. Additionally, whenever one of these types of filters is disposed, these integrated supports increase the disposal volume and disposal costs. This problem relates most particularly to rigid frame or pretensioned filters.

Another problem with these prior art filters involves their attachment to the shaker. As previously described, each filter is secured to the shaker by means of bolts and associated clamps. A series of eight bolts and clamps, i.e., four bolts and associated clamps on either side of the filter, are generally necessary to hold each filter in place within the shaker. In order to remove a filter so the filter can be inspected, cleaned or replaced, it is necessary to loosen all eight of the bolts, knock the drawbars loose from each side of the shaker, remove and replace the filter, reinstall all drawbars and then retighten all eight bolts. This takes an average of about 15 minutes of downtime per screen. Thus, for a shaker employing a series of three screens, the total shaker downtime required for filter maintenance is approximately 45 minutes. Each time the shaker is out of operation, drilling must cease or a second shaker must be employed. Thus, downtime for a shaker translates into a significant financial burden due to the forced downtime of the drilling rig or additional expense of the second shaker.

A further problem with prior art filters of the hookstrip type is that they are curved upward in their center relative to their sides due to the tensioning of the screens over the support components. The pretensioned or rigid frame types of filters are generally not arched in this manner. This upward curvature is due to the arched support components provided under the filters in order to support the filters when fluid is introduced onto their top surfaces and to prevent flexing of the filters when shaken. As previously described, prior art filters of the hookstrip type are tensioned over these support structures when the filters are secured to the shaker, thus causing the top surface of the filters to be arched. Because the filters are arched from side to side, and canted from front to back, this arched or curved configuration decreases the area of the filter's surface which is exposed to drilling fluid and thereby decreases the filter's efficiency when compared with a non-arched, i.e., flat, filters.

The present invention addresses these problem s by providing a filter which does not employ integral metal support structures but instead relies on support from the assembly into which it inserts. The assembly may be either provided as an integral part of new shakers or provided as a retrofit assembly for existing shakers. The assembly is provided with a hinged lid which can be easily opened and reclosed, allowing filters to be removed and replaced within the assembly in a matter of seconds. The assembly allows the filters to be flat, i.e., not arched in the middle relative to the sides, thus allowing the present filters to function more efficiently than prior art arched filters. Also, due to the elimination of the integral metal support structure in the filters, the cost of producing the filters and the cost of disposing of the filters are both greatly reduced.

SUMMARY OF THE INVENTION

The present invention is a shaker screen assembly for use in retrofitting existing shakers or which can be incorporated into newly manufactured shakers. The assembly is comprised of a series of rearwardly canted, cascading compartments. Each of the compartments is provided with a front end, and a rear end and a perforated bottom, which lies between its front and rear ends. Each compartment is provided with a removable corrugated lip along its front end and another removable corrugated lip along its rear end.

The assembly is provided with a left side wall which serves as a common wall for all compartments and an opposite right side wall which serves as a common wall for all compartments. The front compartment in the series is provided with a front wall and the, last compartment in the series is provided with a removable rear wall. Removable common walls are provided between and serve to separate adjacent compartments. The common walls and the rear wall are each provided with a plurality of spaced apart port holes. The port holes coincide with valleys provided in the corrugated lips located in each of the compartments and also coincide with valleys provided in corrugated filters which rest upon the lips. Each of the compartments is provided with an associated removable corrugated filter and with a removable lid. Each filter is held in its associated compartment by its corresponding lid so that the corrugations of the filters are parallel with a longitudinal axis of the assembly. Each lid is provided with four spring-loaded hinge clips, one clip extending outward from each of the two ends of a front edge of the hinged lid and one clip extending outward from each of the two ends of a rear edge of the lid. Each clip is provided with a spring-loaded rod which is spring biased to extend outward from the lid in order to engage associated clip receiving eyes provided on the left and right side walls. The rods are retracted in order to disengage the eyes. Each lid is locked closed when all of the rods of its clips are engaging their associated eyes. When the rods of the clips provided on the front edge, or alternately, when the rods of the clips provided on the rear edge of a lid are disengaged from their eyes, the lid may be swung upward away from its compartment and filter, pivoting or being hinged on the two clips which remain engaged with their eyes. Or, if desired, all four of the clips on the lid may be disengaged and the entire lid assembly removed for better access to the screen or for replacement of the lid if damaged or when replacement is otherwise desired. Each lid is provided with a left lid wall and an opposite right lid wall. The left and right lid walls are spaced apart and located on either side of the lid so that when the lid is closed, the left and right lid walls are located between the left and right side walls, with the left lid wall being adjacent to the left side wall and the right lid wall being adjacent to the right side wall. Each of the lid walls is provided with a flexible seal extending outward from the lid so that the seals engage the side walls forming a liquid tight seal between each of the lid walls and the adjacent side wall when the lids are closed onto their compartment.

Each lid is provided with one or more support rods. Each support rod extends perpendicular to the longitudinal axis of the assembly and secures on one end to the left lid wall and secures on an opposite end to the right lid wall. Each lid is provided with a plurality of parallel and spaced apart blades which extend parallel with the longitudinal axis of the assembly. Each blade is secured on one of its ends to the front edge of the lid, secured on its other end to the rear edge of the lid and secured to the support rods to hold each blade in an upright orientation. The blades coincide with the valleys of the corrugated filters and valleys of the associated lips. Each of the blades is provided with a rounded lower edge which engages an associated valley of its associated filter when the lid is closed. When the lids are closed, hills in the corrugated filters coincide with hills in their associated corrugated lips, and one hill of the corrugated filter extends upward so that it resides between adjacent blades of its associated lid. Each of the blades is provided with a plurality of openings therein to allow liquid communication through the blades horizontally in a direction perpendicular to the longitudinal axis of the assembly.

The filters employed with this assembly are special because they do not need to be provided with an integral rigid supporting structure since the assembly provides the necessary support for them. Thus, the filters are created especially for use with this assembly. The steps in creating the filters consist of placing a thermoplastic material, such as a perforated sheet or spaced apart pellets between layers of different mesh size wire cloth, heating the layers of wire cloth until the thermoplastic material becomes fluid, cooling the layers of wire cloth until the thermoplastic material hardens and bonds the layers of wire cloth together. The layers of wire cloth are provided with side edges either during the heating process or after the thermoplastic has cooled. Finally, the bonded layers of wire cloth are corrugated to form the finished corrugated filter employed with the assembly.

DETAILED DESCRIPTION OF THE PREFERRED EMBODIMENT

Invention

Figure 1:
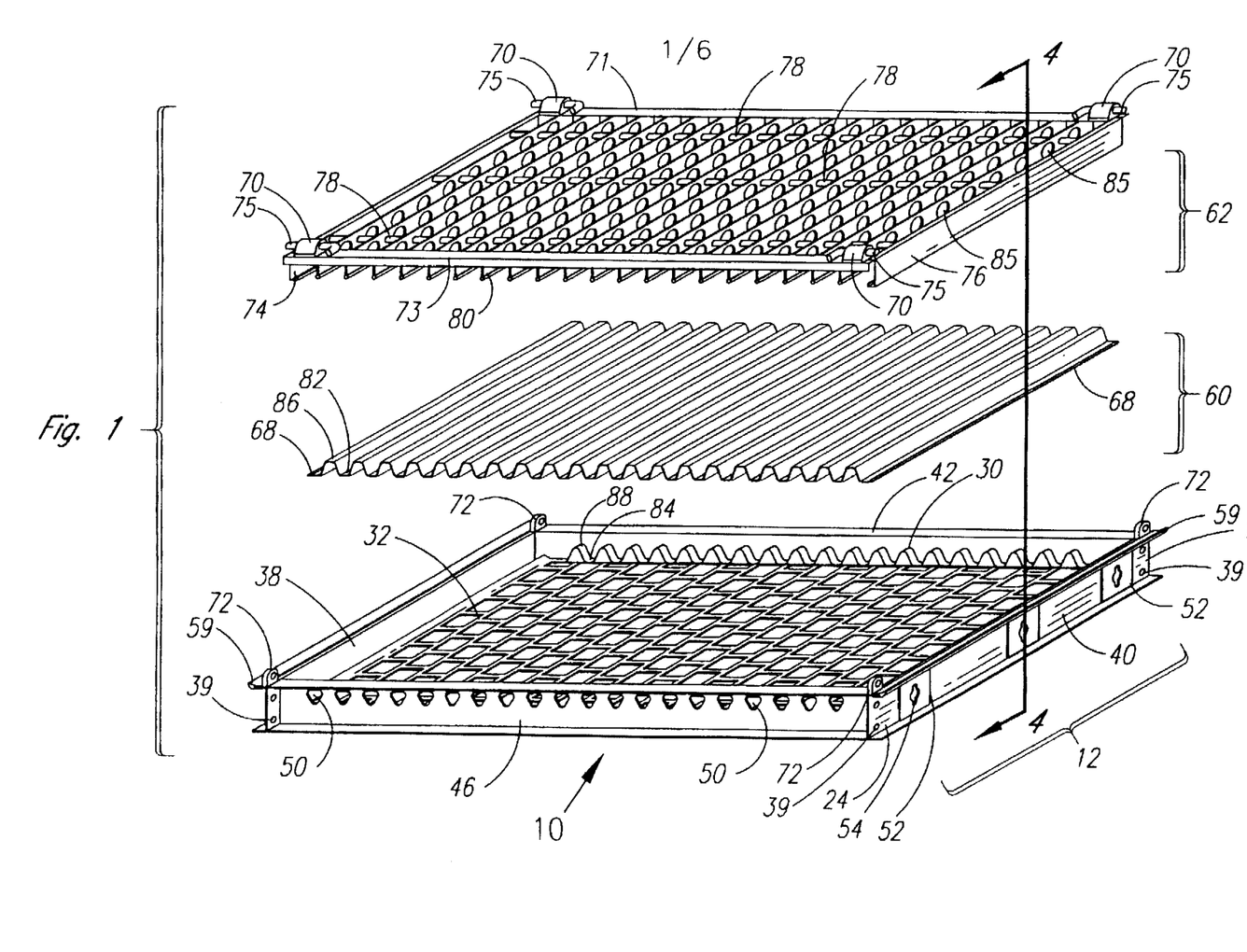
FIG. 1 is an exploded view of a single filter compartment of a shaker screen assembly constructed in accordance with a preferred embodiment of the present invention.
Figure 5:
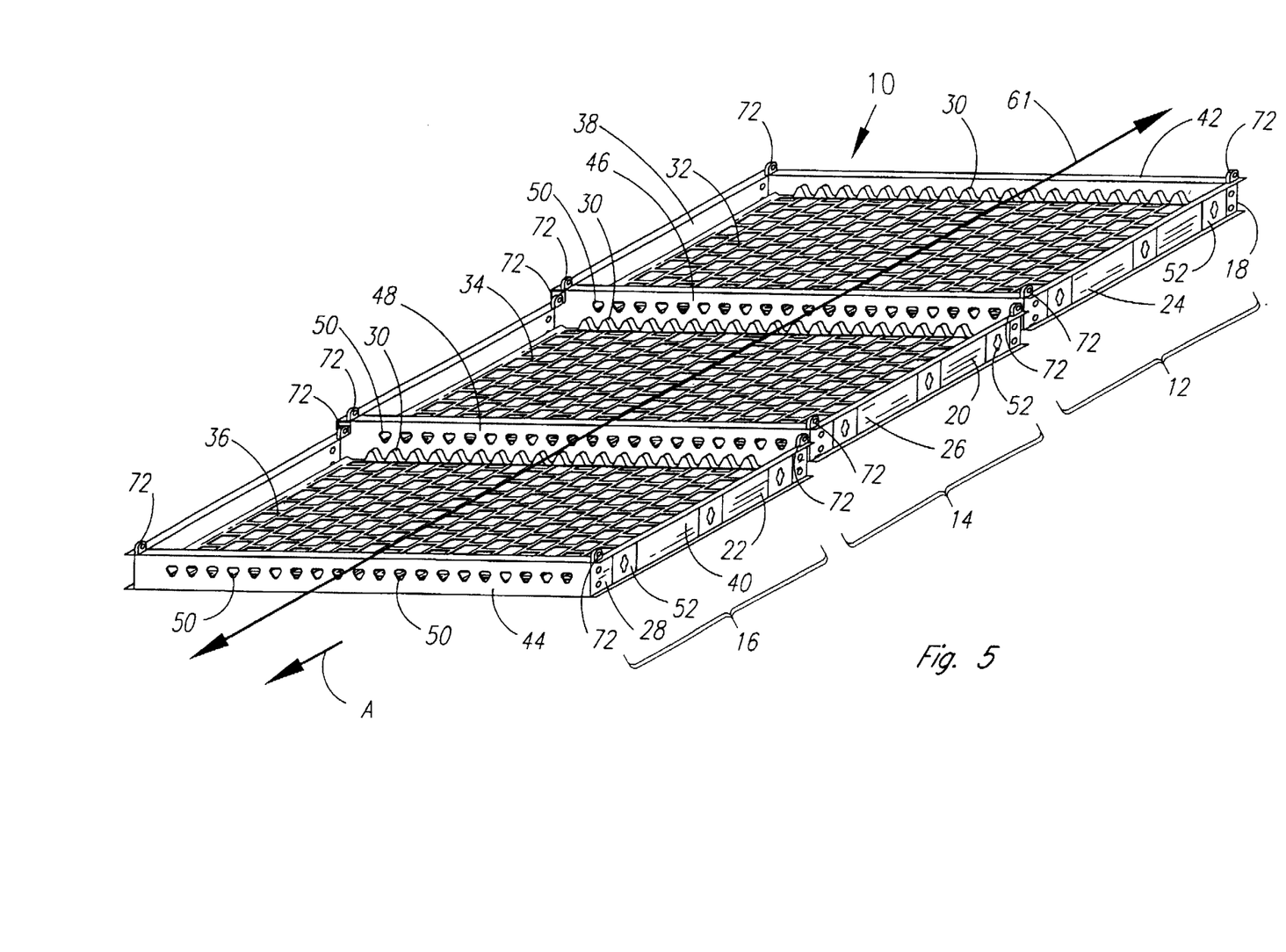
FIG. 5 is a perspective view of a shaker screen assembly constructed in accordance with a preferred embodiment of the present invention consisting of three filter compartments and shown with its filters and hinged lids removed.

Referring now to the drawings and initially to FIGS. 5 and 1, there is illustrated a shaker screen assembly 10 constructed in accordance with a preferred embodiment of the present invention. The assembly 10 illustrated in FIG. 5 is shown with its filters and lids removed, as will be more fully explained hereafter in reference to FIG. 1. The assembly 10 of FIG. 5 includes three filter compartments, a front compartment 12, a second compartment 14 and a rear compartment 16.

As shown in FIG. 5, each compartment 12, 14, and 16 is provided with a front end 18, 20 and 22, respectively, and an opposite rear end 24, 26 and 28, respectively. The compartments 12, 14 and 16 are provided in a cascading series within the assembly 10. When it is stated that the compartments 12, 14 and 16 are in a series, this means they are arranged with compartment 12 adjacent to and in front of compartment 14 and with compartment 14 adjacent to and in front of compartment 16. When it is stated that the compartments 12, 14 and 16 are cascading, this means that each of the compartments 12, 14 and 16 is canted upward rearwardly so that the rear end 24 of compartment 12 is positioned above or is higher relative to the front end 20 of compartment 14 and the rear end 26 of compartment 14 is positioned above or is higher relative to the front end 22 of compartment 16. Along the length of each front end 18, 20 and 22 and along the length of each rear end 24, 26 and 28, each of the compartments 12, 14 and 16 is provided with removably corrugated lips 30 which extend upward from a perforated bottom 32, 34 and 36 provided in each compartment 12, 14 and 16, respectively. Each of the corrugated lips 30 may be made of a flexible material such as rubber, or alternately, may be additionally provided with a flexible gasket 37 along an upper surface of each lip 30 against which a filter can seal, as will be more fully explained hereafter.

The compartments 12, 14 and 16 are provided with a common left side wall 38 and a common right side wall 40, with each wall 38 and 40 attaching to and extending perpendicularly upward from a side edge of the perforated bottoms 32, 34 and 36. The walls 38 and 40 are provided with holes 39, with a pair of holes 39 provided on each wall 38 and 40 at each of the following locations: at the front end 18 of the front compartment 12, at the rear end 24 of the front compartment 12, at the front end 20 of the second compartment 14, at the rear end 26 of the second compartment 14, at the front end 22 of the rear compartment 16, and at the rear end 28 of the rear compartment 16. The front end 18 of the front compartment 12 is provided with a front wall 42 which secures on one end perpendicularly to the left side wall 38 and secures on an opposite end perpendicularly to the right side wall 40 via holes 39. Although not illustrated in the drawings, fastening means, such as screws or bolts, can be inserted through each of the holes 39 in order to secure the rear wall 44 to the walls 38 and 40. A lower side of the front wall 42 secures perpendicularly to the perforated bottom 32 on the front end 18 of the front compartment 12.

Likewise, the rear end 28 of the rear compartment 16 is provided with a rear wall 44 which secures on one end perpendicularly to the left side wall 38 and secures on an opposite end perpendicularly to the right side wall 40 via holes 39 as previously described. A lower side of the rear wall 44 secures perpendicularly to the perforated bottom 36 on the rear end 28 of the rear compartment 16.

A first common wall 46 is provided between the first compartment 12 and the second compartment 14 and thus separates the compartments 12 and 14 from each other. The first common wall 46 secures on one end perpendicularly to the left side wall 38 and secures on an opposite end perpendicularly to the right side wall 40 via holes 39 as previously described. A lower side of the first common wall 46 secures perpendicularly to the perforated bottom 32 on the rear end 24 of the front compartment 12 and also secures perpendicularly to the perforated bottom 34 on the front end 20 of the second compartment 14.

A second common wall 48 is provided between the second compartment 14 and the rear compartment 16. The second common wall 48 secures on one end perpendicularly to the left side wall 38 and secures on an opposite end perpendicularly to the right side wall 40 via holes 39 as previously described. A lower side of the second common wall 48 secures perpendicularly to the perforated bottom 34 on the rear end 26 of the second compartment 14 and also secures perpendicularly to the perforated bottom 36 on the front end 22 of the rear compartment 16.

As illustrated in FIG. 5, a number of port holes 50 are provided in a horizontal row on each of the first common wall 46, the second common wall 48 and the rear wall 44. No port holes 50 are provided in the front wall 42, nor in the left or right side walls 38 and 40. The port holes 50 are preferably triangular in shape, with one corner of each triangular shaped port hole 50 being oriented downward. Each port hole 50 extends through its respective wall 46, 48 or 44. The purpose for the port holes 50 is to allow tailings (not illustrated) to pass from the compartments 12, 14 and 16, as will become clear hereafter. Each of the walls 46, 48 and 44 are preferably removable from the assembly 10 and replaceable. It may be desirable to remove and replace the walls 46, 48 and 44 when port holes 50 of different spacing are required, as will be explained hereafter.

Although the assembly 10 has been described as containing three compartments, 12, 14 and 16, the invention is not so limited, and the invention encompasses assemblies (not illustrated) including fewer or greater than three compartments.

Figures 2, 3, 3A:
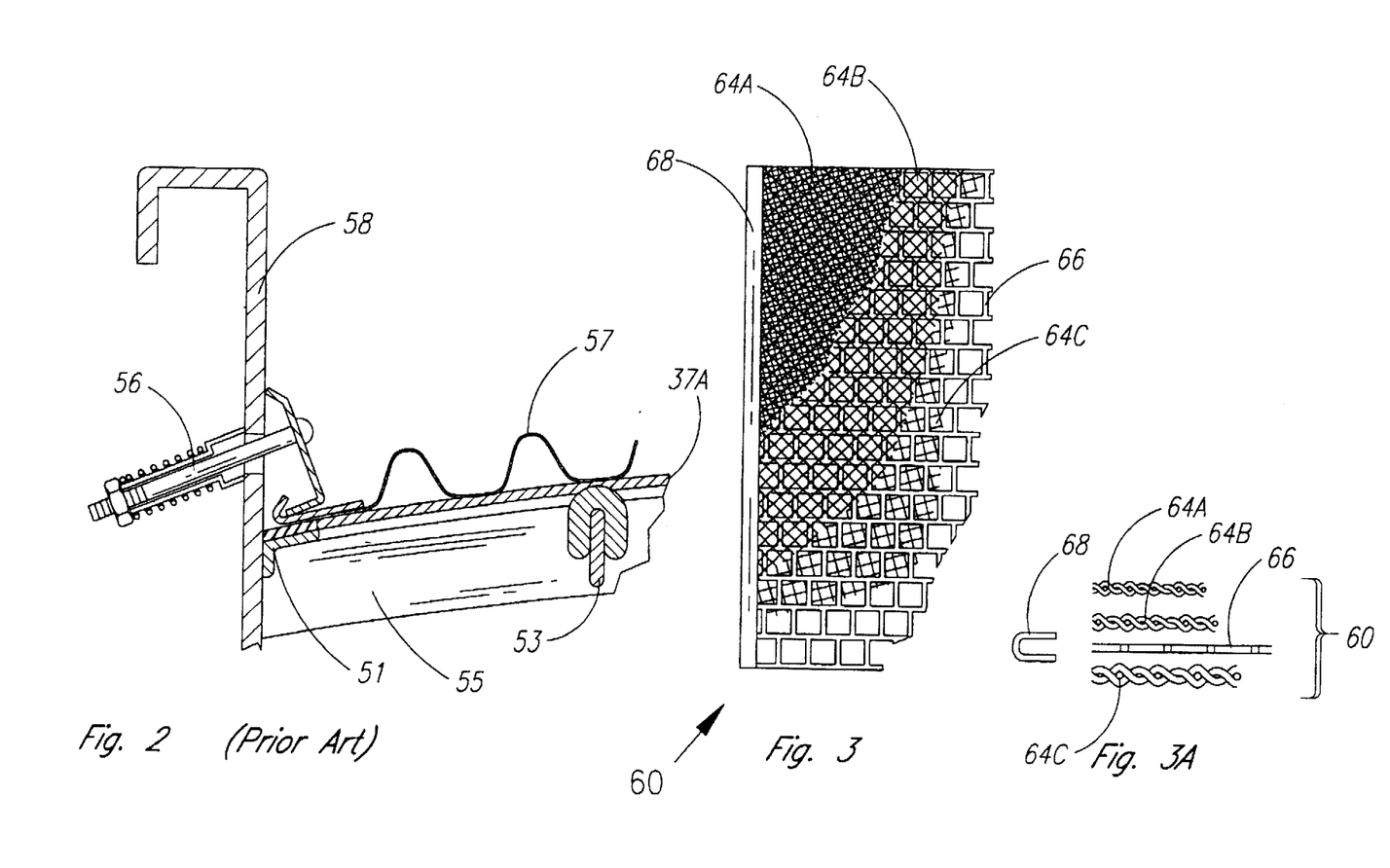
FIG. 2 is a cross-sectional view of a prior art filter illustrating its attachment to an existing shaker.
FIG. 3 is a partially cut away top plan view of the filter of FIG. 1, shown prior to being corrugated.
FIG. 3A is an exploded cross-sectional view of the filter of FIG. 3.
Figure 4:
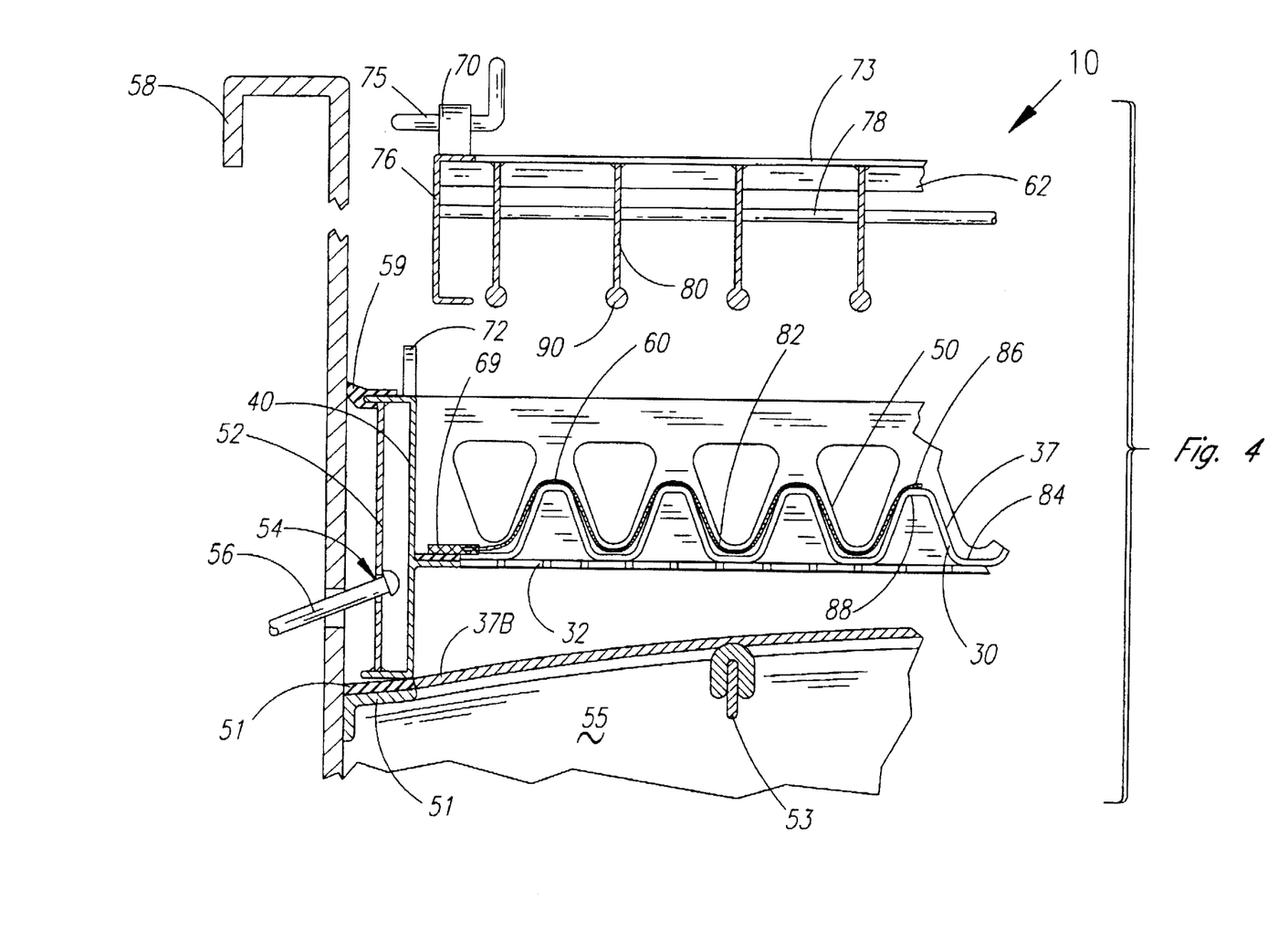
FIG. 4 is a cross-sectional view of the assembly of FIG. 1 taken along line 4—4, illustrating one means of attaching the assembly to a shaker.

Referring now to FIG. 1, the front compartment 12 is shown in more detail as it would appear if removed from the remaining portions of the assembly 10. Both the left and right side walls 38 and 40 are provided with brackets 52 with openings 54 therein to receive a bolt 56 in order to secure the assembly 10 to a wall of an existing shaker 58. This is illustrated for the right side wall 40 in FIG. 4. The bolt 56 illustrated in FIG. 4 is a tensioning type bolt, typical of those commonly used on existing shakers 58 which employ prior art hookstrip type filters 57, as illustrated in FIG. 2. Also shown in FIG. 2 is a prior art arched support component 55. Multiple support components 55 are provided on the shaker 58 extending between opposite walls of the shaker 58. These arched support components 55 arch upward and are joined to longitudinal supports 53 which are also provided on the shaker 58. The longitudinal supports 53 extend parallel with a longitudinal axis 61 of the assembly 10 and are generally perpendicular to the support components 55. The arched support components 55 are secured to walls of the shaker 58 and to shaker tabs 51 provided on walls of the shaker 58. Each of the hookstrip type filters 57 rests upon a prior art flexible gasket 37B located between the filter 57 and the multiple support components 55 which underlie the filter 57.

Figure 6:
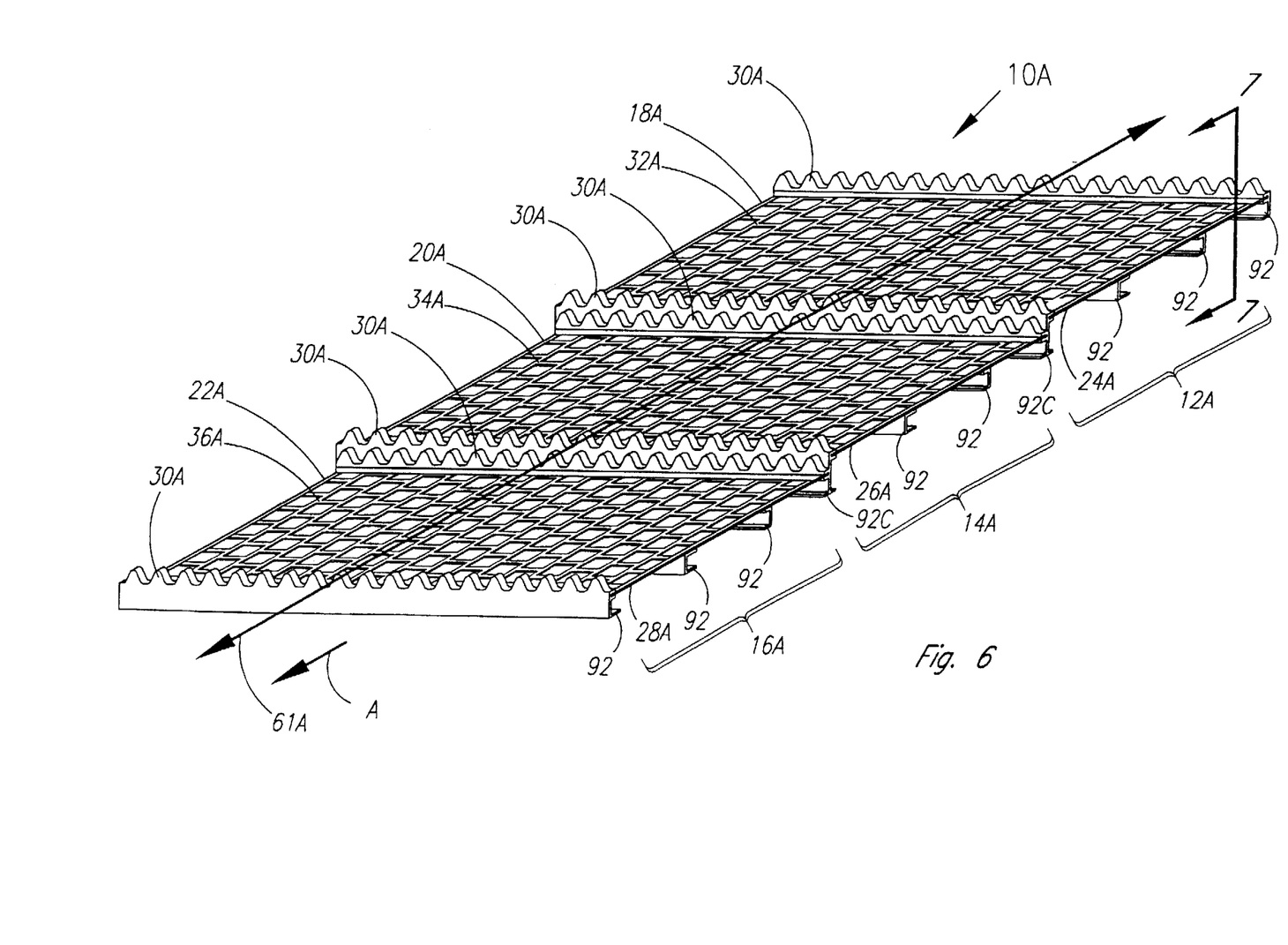
FIG. 6 is a perspective view of an alternate embodiment shaker screen assembly which has been removed from the shaker with which it is manufactured as an integral part. The alternate embodiment shaker screen assembly consists of three filter compartments and is shown with its filters and hinged lids removed.
Figure 7:
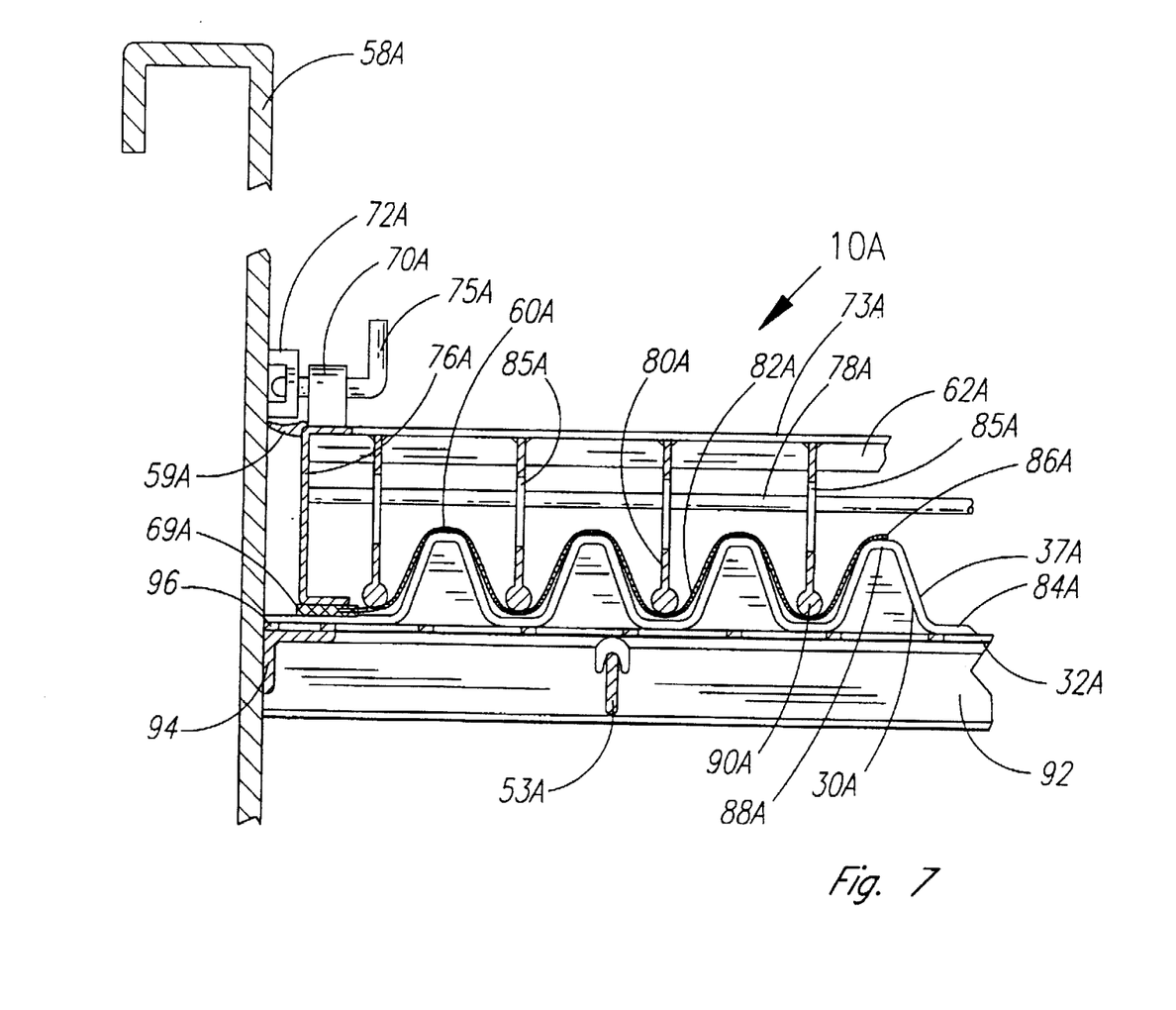
FIG. 7 is a cross-sectional view of the assembly of FIG. 6 taken along line 7—7 showing the assembly as it would appear with filters and lids in place and the assembly replaced in the shaker within which it is made as an integral part of the shaker.

The assembly 10 of FIG. 4 also is provided with two seals 59. One seal 59 secures to and extends outward from the left side wall 38. Another seal 59 secures to and extends outward from the right side wall 40. The seals 59 serve to seal the assembly to a wall of the existing shaker 58 and to provide a resilient interface between the assembly 10 and the shaker 58. Alternately, although not specifically illustrated in the attached drawings, the assembly 10 may be secured to the shaker 58 by welding or other suitable type of fastening means. Alternately, as illustrated in FIGS. 6 and 7 and discussed in greater detail hereinafter, an alternate embodiment assembly 10A can be made integrally into walls of a new shaker 58A at the time the new shaker 58A is manufactured.

Referring now to FIGS. 1 and 4, a removable corrugated filter 60 is illustrated positioned in the front compartment 12. A removable hinged lid 62 closes against the filter 60 in order to secure the filter 60 within the compartment 12.

The filter 60, as illustrated in FIG. 3, is preferably comprised of approximately three layers of wire cloth 64A, 64B, and 64C, bonded together so that consecutively larger weaves of wire cloth 64A, 64B, and 64C are encountered from top to bottom of the filter 60. The layers of wire cloth 64A, 64B and 64C are preferably bonded together by employing a thermoplastic material 66, such as a perforated thermoplastic base sheet which, when heated and then cooled, bonds the layers of wire cloth 64A, 64B, and 64C together. It is important to sandwich the thermoplastic material 66 between the wire cloth 64A and 64B, or alternately, 64B and 64C in order to achieve good bonding of all layers. Alternately, instead of employing a perforated thermoplastic base sheet, thermoplastic pellets can be employed. Spacing the pellets apart from each other achieves the same effect as using a perforated sheet. It is important that when using pellets that the pellets are sandwiched between the wire cloth 64A and 64B, or 64B and 64C or 64A, 64B and 64C so that the thermoplastic material 66 engages all layers of wire cloth 64A, 64B and 64C in order to form a good bond therebetween when the thermoplastic material 66 is allowed to cool and harden. It is also important when employing pellets that the pellets be spaced a sufficient distance apart that when they are melted in the process of making the filters, 60, the thermoplastic material 66 of adjacent pellets does not run together so as to completely obstruct liquid passage through the wire cloth 64A, 64B and 64C. The preferred thermoplastic material 66 for use as a perforated thermoplastic base sheet, or alternately, as thermoplastic pellets, is polypropylene, and it is generally desirable to heat the polypropylene to approximately 300°–500° F. in order to cause the polypropylene to reach a fluid condition so it will bond the layers of wire cloth 64A, 64B, and 64C together. However, other thermoplastic materials 66, such as nylon, or, alternately, a liquid adhesive (not illustrated), such as epoxy, may be employed for this purpose.

In order to bond the layers of wire cloth 64A, 64B and 64C, they are heated, along with the thermoplastic material 66, i.e., either the sandwiched thermoplastic base sheet or the sandwiched thermoplastic pellets, between opposing surfaces of a heated press. Once the thermoplastic material 66 is heated sufficiently in order to cause it to become fluid, the wire cloth 64A, 64B and 64C is removed from the press and allowed to cool so the thermoplastic material 66 hardens and bonds the layers of wire cloth 64A, 64B and 64C together.

Once the three layers of wire cloth 64A, 64B, and 64C have been bonded together, left and right side edges 68 and 69 are secured respectively to left and right sides of the wire cloth 64A, 64B and 64C, as illustrated in FIG. 3. Alternately, another way of providing left and right side edges 68 and 69 on the bonded wire cloth 64A, 64B and 64C is to add extra strips of thermoplastic material 66 on side edges of the wire cloth 64A, 64B and 64C prior to inserting them into the heated press.

Finally, the three layers of wire cloth 64A, 64B, and 64C, which are now bonded together by the thermoplastic material 66 and have been provided with left and right side edges 68 and 69, are corrugated as a unit to form the corrugated filter 60 shown in FIGS. 1 and 4.

As illustrated in FIGS. 1 and 4, the corrugated filter 60 inserts in the front compartment 12, with a front edge of the corrugated filter 60 resting in mating fashion on the corrugated lip 30 provided at the front end 18 of the front compartment 12 and an opposite rear edge of the corrugated filter 60 resting in mating fashion on the corrugated lip 30 provided on the rear end 24 of the front compartment 12. As shown in FIG. 4, the gasket 37, if employed, lies on an upper surface of the lip 30 and forms a seal between the lip 30 and front and rear edges of the filter 60. If a gasket 37 is not employed, but rather the lips 30 are formed of a resilient material, the lips 30 seal directly with the front and rear edges of the filter 60.

The hinged lid 62 is provided with four spring-loaded hinge clips 70, so that two of the clips 70 are provided on either side of a front edge 71 of the lid 62 and two clips 70 are provided on either side of a rear edge 73 of the lid 62. Each clip 70 is provided with a spring-loaded rod 75 which retractably engages an associated clip receiving eye 72. Clip receiving eyes 72 are provided on the left and right side walls 38 and 40.

The hinged lid 62 is provided with a left lid wall 74 which extends between the front edge 71 of the lid 62 and the rear edge 73 of the lid on a left side of the lid 62 and is provided with an opposite right lid wall 76 which extends between the front edge 71 of the lid 62 and the rear edge 73 of the lid 62 on an opposite right side of the lid 62. The left and right lid walls 74 and 76 are slightly closer together than are the left and right side walls 38 and 40 so that when the lid 62 is closed, as shown in FIG. 4, the lid walls 74 and 76 are located between the side walls 38 and 40.

One or more support rods 78 extend between and secure on one of their ends to the left lid wall 74 and secure on their opposite ends to the right lid wall 76. Each support rod 78 is located between the front and rear edges 71 and 73 of the lid 62 and is spaced apart therefrom. A plurality of blades 80 are provided on the lid 62. Each of the blades 80 secures on one end to the front edge 71 and secures on an opposite end to the rear edge 73 of the lid 62. Each of the blades 80 attaches perpendicularly to and is supported in a downwardly oriented position by the support rods 78.

The blades 80 are spaced apart so the blades 80 coincide with valleys 82 in the corrugated filter 60 and also coincide with valleys 84 in the corrugated lips 30, also so that one hill 86 in the corrugated filter 60 and one hill 88 in each of the two associated corrugated lips 30 provided for the front compartment 12, extend upward between adjacent blades 80. Each blade 80 is provided with a rounded lower edge 90 which engages the valley 82 of the corrugated filter 60 so that the edge 90 does not damage the filter 60 when the lid 62 is closed, as illustrated in FIG. 4. When the lid 62 is closed, the blades 80 press the valleys 82 of the filter 60 in mating fashion into the valleys 84 of the corrugated lips 30, thereby sealing the front and rear edges of the filter 60 to the corrugated lips 30 provided at the front and rear ends 18 and 24 of the front compartment 12 and at the same time the blades 80 press the full length of the valleys 84 of the corrugated filter 60 against the perforated bottom 32 of the compartment 12, thereby firmly securing the filter 60 in the compartment 12 and preventing it from being displaced or flexed by the vibrating motion of the shaker 58.

Referring now to FIG. 1, each blade 80 is provided with a plurality of openings 85 therein to allow dirty drilling fluid to pass laterally therethrough between adjacent valleys 82 in order that a more even distribution of drilling fluid onto the filter 60 is facilitated when the shaker 58 is in operation. Also, as further illustrated in FIG. 4, for the right lid wall 76, both the left lid wall 74 and the right lid wall 76 secure respectively the left and right side edges 68 and 69 of the filter 60 against the perforated bottom 32 of the compartment 12 when the lid 62 is closed.

Referring again to FIG. 4, the relationship of the port holes 50 to the blades 80 and the valleys 82 of the filter 60 can be seen. A port hole 50 is provided associated with each blade 80, associated with each valley 82 in the corrugated filter 60 and associated with each of the associated valleys 84 in the corrugated lips 30.

Although the filter 60 and lid 62 have been illustrated and described in relationship to the first compartment 12, each of the remaining compartments 14 and 16 are also provided with a filter 60 and a lid 62 identical to those described for the first compartment 12.

In order to remove the filter 60 from the compartment, either 12, 14 or 16, it is necessary to retract the spring-loaded rods 75 on two of the clips 70, either the two clips 70 on the front edge 71 or the two clips 70 on the rear edge 73 of the lid 62, so the rods 75 disengage their associated clip receiving eyes 72. When two of the clips 70 are thus disengaged, the lid 62 can be pivoted at the two clips 70 which remain engaged with their associated clip receiving eyes 72, thereby allowing the engaged clips 70 to serve as hinges for the lid 62, and allowing the lid 62 to be swung open relative to its associated compartment, either 12, 14 or 16. When the lid 62 is opened, the filter 60 which had previously been captured within the compartment, either 12, 14 or 16, by the closed lid 62, is now free to be lifted out of the compartment, either 12, 14 or 16.

Once the old filter 60 has been removed, a new clean filter 60 can be inserted within the compartment, either 12, 14 or 16. The lid 62 is then pivoted on the engaged clips 70 so that the rods 75 of two clips 70 which were previously disengaged can reengage their associated clip receiving eyes 72 in order to close the lid 62 and to lock the new filter 60 within the compartment, either 12, 14 or 16.

In order to remove the lid 62 completely from the assembly 10, the springloaded rods 75 on all four of the clips 70 are retracted to disengage the rods 75 from their associated clip receiving eyes 72. The lid 62 may then be lifted up off the assembly 10 for replacement or repair. Because the lids 62, the filters 60, the corrugated lips 30, the common walls 46 and 48, and the rear wall 44 are all removable and replaceable on the assembly 10, it is a simple matter to change the spacing of corrugations on a filter in order to obtain optimum number of corrugations per filter and optimum distance between adjacent corrugations for the particular filtering application.

If desired, the corrugated lips 30 can be replaced with non-corrugated or flat lips (not illustrated) so that non-corrugated or flat filters can be installed in the assembly 10 in lieu of corrugated filters 60. This will allow the prior art hookstrip type flat filters 57 to be employed with the assembly 10 until any excess supply of prior art hookstrip type flat filters 57 can be expended, saving the cost of discarding or discontinuing use of prior art filters 57 in stock.

Operation

The device 10 attaches within or is integrally made as a part of a shaker 58, as has been previously described. When the shaker 58 is operating, the device 10 is shaken in order to facilitate removal of solids or tailings from the medium being filtered, i.e., the medium being filtered is typically drilling fluid. The dirty drilling fluid is introduced onto a top surface of a filter 60 which is secured within the front compartment 12 of the device 10 by the lid 62. The dirty drilling fluid preferably is introduced onto the filter 60 at a front end 18 of the front compartment 12. The dirty drilling fluid spreads out laterally on the filter 60 by flowing through the openings 85 provided in the blades 80 of the lid 62. A liquid component of the drilling fluid runs through the filter 60, leaving a solid component of the drilling fluid, i.e., tailings, on the filter 60. The shaking action of the device 10 causes the tailings to move or crawl along the surface of the filter 60 to the rear end 24 of the front compartment 12, moving in the direction indicated by arrow "A" in FIG. 5. The tailings pass through port holes 50 provided in the first common wall 46 and fall down onto a top surface of the filter 60 which is secured in the second compartment 14. Specifically, the tailings fall onto the filter 60 at the front end 20 of the second compartment 14. Because the device 10 is being shaken, this shaking action causes the tailings to crawl along the filter 60 to the rear end 26 of the second compartment 14. The tailings then pass through port holes 50 provided in the second common wall 48 and fall down onto a top surface of the filter 60 which is secured in the rear compartment 16. The tailings fall onto the filter 60 at the front end 22 of the rear compartment 16, and are caused by the shaking action to crawl along the filter 60 to the rear end 28 of the rear compartment 16. The tailings then pass through port holes 50 provided in the rear wall 44 and fall down into a disposal portion of the shaker 58 from which they are disposed.

In order to service the assembly 10, flow of drilling fluid is caused to cease and the shaker 58 is deactivated. Next, the spring-loaded rods 75 of two of the clips 70 for each compartment 12, 14 and 16 are retracted so that they disengage their respective clip receiving eyes 72. Each of the lids 62 is then pivoted on the two clips 70 which remain engaged to their clip receiving eyes 72 in order to open each of the lids 62 relative to their respective compartments 12, 14 and 16. The filters 60 may then be lifted out of their compartments 12, 14 and 16 for cleaning, repair or replacement.

If it is desirable to change to a filter 60 having fewer or having more corrugations, it will be necessary to remove the lid 62 completely by disengaging all the clips 70 and replacing the lid 62 with a new lid 62 which has the desired spacing for the blades 80 in order that the blades 80 coincide with the spacing of corrugations on the new filter 60. Also, it will be desirable to replace the lips 30 with lips 30 having corrugations which coincide with the corrugations of the new filter 60, and replaces the first and second common walls 46 and 48 and the rear wall 44 with walls 48, 48 and 44 which are provided with port holes 50 spaced so the port holes 50 correspond to the corrugations of the new filter 60. When servicing is completed, the filters 60 are reinserted into the compartments 12, 14 and 16. The lids 62 are then pivoted to close the lids 62 onto their respective filters 60 and all unattached clips 70 are made to reengage their respective eyes 72.

Referring now to FIGS. 6 and 7, there is illustrated the alternate embodiment shaker screen assembly 10A constructed in accordance with a preferred embodiment of the present invention for use when the invention is employed in the manufacture of the new shaker 58A, rather than as a retrofit onto the existing shaker 58. FIG. 6 shows the alternate embodiment assembly 10A, removed completely from the new shaker 58A and with its lids 62A and its corrugated filters 60A removed. FIG. 7, on the other hand, shows the alternate embodiment assembly 10A as it would appear in cross section secured within the new shaker 58A, including its lids 62A and corrugated filters 60A.

Hereafter in describing the alternate assembly 10A, elements present on the alternate assembly 10A which are similar to elements previously described in relationship to the assembly 10 will be designated with the same numerals as those previously used in association with elements of assembly 10, with each numeral followed by an "A" to indicate the element is associated with the alternate assembly 10A. Thus, for example, a front compartment 12A on assembly 10A corresponds to the same element, i.e., the front compartment 12, provided on assembly 10.

The alternate assembly 10A employs walls of the new shaker 58A as a surface for the seal 59A to engage, and as a surface for attaching the clip receiving eye 72A, thus eliminating the need for right and left side walls 38 and 40 as employed in assembly 10. This can best be seen by comparing FIGS. 4 and 7.

Longitudinal supports 53A extend approximately parallel with a longitudinal axis 61A and extend between adjacent transverse or combined transverse support members 92 or 92C. One transverse support member 92 is provided at the front end 18A of the front compartment 12A, one is provided at the rear end 28A of the rear compartment 16A of the assembly 10A, two transverse support members 92 are provided spaced apart from each other and located between the front and rear ends, 18A and 24A of compartment 12A, two transverse support members 92 are provided spaced apart from each other and located between front and rear ends 20A and 26A of compartment 14A and two transverse support members 92 are provided spaced apart from each other and located between front and rear ends 22A and 28A of compartment 16A.

A single combined transverse support member 92C is provided located at the rear end 24A of the front compartment 12A and also at the front end 20A of the second compartment 14A, as illustrated in FIG. 6. Likewise, as also illustrated in FIG. 6, a single combined transverse support member 92C is provided located at the rear end 26A of the second compartment 14A and also located at the front end 22A of the rear compartment 16A.

Comparing now FIGS. 4 and 7, the alternate assembly 10A eliminates the shaker tabs 51, the brackets 52, the bolt 56, the first common wall 46, the second common wall 48, the front wall 42, the rear wall 44, the port holes 50, and the arched support components 55. The transverse and combined transverse support members 92 and 92C attach directly either by welding or other similar means of attachment to walls of the new shaker 58A. Seals 59A are secured to a left lid wall, not illustrated but comparable to 74 on assembly 10, and a right lid wall 76A, as illustrated in FIG. 7.

The perforated bottoms 32A, 34A and 36A provided respectively in first, second and rear compartments 12A, 14A and 16A rest on top of the transverse and combined transverse support members 92 and 92C. Thus, the perforated bottoms 32A, 34A and 36A are supported by the transverse and combined transverse support members 92 and 92C at the front ends 18A, 20A, 22A and at the rear ends 24A, 26A and 28A. Also, the perforated bottoms 32A, 34A and 36A receive additional support from the longitudinal supports 53A, upon which they also rest. Inwardly extending longitudinal rails 94 are provided extending between adjacent transverse and combined transverse support members 92 and 92C so that the longitudinal rails 94 lie adjacent to and are secured to the walls of the new shaker 58A. Side edges 96, provided on each perforated bottom 12A, 14A and 16A, rest upon and are supported by the longitudinal rails 94.

As illustrated in FIG. 7, the perforated bottom 32A and the corrugated filter 60A are held in place in the assembly 10A by the lid 62A when it is closed. Likewise, perforated bottoms 34A and 36A and their associated corrugated filters 60A are held in place in the assembly 10A by their associated lids 62A. In order to service the assembly 10A, the lids 62A are either opened or removed completely employing the same steps previously described in connection with the assembly 10. Next, the corrugated filters 60A can be removed and, if desired, the corrugated lips 30A can be removed in order to then remove the perforated bottoms 32A, 34A and 36A. New perforated bottoms 32A, 34A and 36A are then inserted into the compartments 12A, 14A and 16A. Next, the corrugated lips 30A are replaced and new corrugated filters 60A are inserted into the compartments 12A, 14A and 16A before the lids 62A are again closed or replaced in assembly 10A so the lids 62A are in their closed positions.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A shaker screen assembly comprising:
    at least one compartment box securable between opposite walls of a shaker, each side compartment box comprised of left and right side walls jointed together in spaced apart manner by a front wall and opposite rear wall,
    a perforated bottom removable secured within each said compartment box,
    a corrugated filter removably secured to each said compartment box between each said lid and its associated said perforated bottom,
    a lid removable secured to each said compartment box for securing said corrugated filter between each said lid and its associated said perforated bottom,
    right and left lid wails being secured to said lid,
    support rods extending approximately perpendicular to a longitudinal axis of a shaker screen assembly and extending between and secured to right and left lid walls,
    at least four spring-loaded hinge clips provided on each said lid, each said clip removable engagable with an associated clip receiving eye provided secured to said walls of said shaker, and
    a plurality of blades secured to and extending downward from and approximately perpendicular to said support rods.

2. A shaker screen assembly according to claim 1 wherein each said lid further comprises:
    a rounded lower edge being provided on each said blade, and
    each blade being provided with a plurality of openings therethrough.

3. A shaker screen assembly according to claim 1 wherein each said lid further comprises:
    a seal secured to and extending outward from each of said right and said left lid walls so that said seals form a liquid tight barrier between said compartment boxes and said walls of said shaker.

4. A shaker screen assembly according to claim 1 wherein said compartment boxes are arranged in a series with a rear end of a preceding compartment box abutting a front end of a next compartment box.

5. A shaker screen assembly according to claim 1 wherein said corrugated filter is provided with no additional integral support and no hooks for tensioning.

6. A shaker screen assembly according to claim 1 wherein each said corrugated filter is comprised of a plurality of layers of wire cloth secured together with a thermoplastic material.

7. A shaker screen assembly according to claim 6 wherein each said corrugated filter is provided with a left side edge and with a right side edge.

8. A shaker screen assembly according to claim 1 wherein each said corrugated filter is comprised of a plurality of layers of wire cloth bonded together.

9. A shaker screen assembly according to claim 8 wherein said plurality of layers of wire cloth are bonded together with a liquid adhesive.

* * * * *